United States Patent [19]
Zinnes et al.

[11] 3,862,140
[45] Jan. 21, 1975

[54] 4-HYDROXY-2H-1-BENZOTHIOPYRAN-3-CARBOXAMIDE 1,1-DIOXIDES

[75] Inventors: Harold Zinnes, Rockaway; Neil A. Lindo, Chatham, both of N.J.

[73] Assignee: Warner-Lambert Company, Morris Plains, N.J.

[22] Filed: May 31, 1973

[21] Appl. No.: 365,786

Related U.S. Application Data

[63] Continuation-in-part of Ser. No. 251,311, May 8, 1972, abandoned, which is a continuation-in-part of Ser. No. 163,076, July 15, 1971, abandoned.

[52] U.S. Cl............................................ 260/327 TH
[51] Int. Cl............................................ C07d 65/14
[58] Field of Search............................ 260/327 TA

[56] References Cited
UNITED STATES PATENTS
3,636,049   1/1972   McManus.................... 260/327 TH

*Primary Examiner*—Henry R. Jiles
*Assistant Examiner*—C. M. S. Jaisle
*Attorney, Agent, or Firm*—Albert H. Graddis; Frank S. Chow

[57] ABSTRACT

Compounds having the following structural formula are disclosed:

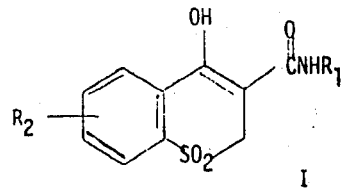

I wherein $R_1$ is aryl which may be substituted or unsubstituted; $R_2$ is alkyl, aryl, aralkyl, alkoxy, halogen, cyano, nitro, trifluoromethyl and the like.

These compounds are prepared by treating a benzothiopyran-4-one 1,1-dioxide with a base and then treating the resulting anion with an appropriate arylisocyanate, or by aminolysis of the 3-carboxylate ester of a benzothiopyran-4-one 1,1-dioxide. These compounds are useful as antiinflammatory agents.

11 Claims, No Drawings

4-HYDROXY-2H-1-BENZOTHIOPYRAN-3-CARBOXAMIDE 1,1-DIOXIDES

This application is a continuation-in-part of our copending application, Ser. No. 251,311 filed May 8, 1972 which is in turn a continuation-in-part of Ser. No. 163,076 filed July 15, 1971 both now abandoned.

The present invention is concerned with 4-Hydroxy-2H-1-benzothiopyran-3-carboxamide 1,1-Dioxides having the following structural formula:

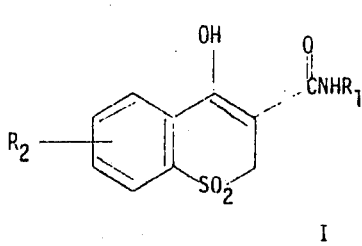

I wherein $R_1$ is aryl such as phenyl or naphthyl. The aryl may be unsubstituted or substituted by groups such as alkyl, aryl, aralkyl, alkoxy, halogen, cyano, nitro, trifluoromethyl and the like. $R_2$ is alkyl, aryl, aralkyl, alkoxy, halogen, cyano, nitro, trifluoromethyl and the like.

In the above definitions, "alkyl" and "alkoxy" contain from one to six carbon atoms, and "aryl" contains six to 10 carbon atoms.

The compounds of this invention are useful as antiinflammatory agents. For example, when they are administered orally or intraperitoneally to laboratory animals such as rats at a dose of 10–200 mg./kg., they are able to cause reduction in the swelling of the paw induced by injection into the foot pads of an irritant such as carrageenin.

These compounds are indicated in relieving inflammation caused, for example, by arthritis in mammals such as cats, dogs, monkeys and the like. Generally speaking, a dose of 10–200 mg. two or three times daily is prescribed to treat such inflammation. Such a dose regimen can be varied depending upon the age, weight, sex and the species of the mammal being treated by methods well known to the healing arts.

In order to use these compounds, they are formulated into dosage forms such as tablets by combining with standard pharmaceutical diluents such as lactose, mannitol and compounded into these dosage forms suitable for oral administration by methods well known to the pharmacist's art. They are also formulated with sterile vehicles such as water for injection into dosage forms suitable for intramuscular administration. In these dosage forms, the active ingredient is present from about 10–200 mg. per dosage unit.

The compounds of this invention also form salts with pharmaceutically acceptable bases such as, for example, with an amine or an alkali metal. These salts are prepared by conventional procedures and are also within the scope of this invention.

According to the process of the invention, a thiochroman-4-one 1,1-dioxide of formula II is converted to the anion by the use of a base such as sodium hydride. This anion is then reacted with the appropriate arylisocyanate of formula III to give I. Compounds of formula II are prepared as described by I. W. J. Still, et. al., J.O.C., 33, 2730 (1968).

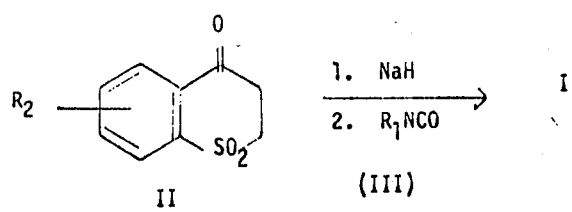

A preferred process for the preparation of these compounds is by aminolysis of a β-ketoester of the formula:

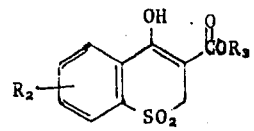

which is fully described in copending application, Ser. No. 243,523, filed Apr. 7, 1972, now abandoned.

In order to further illustrate the practice of this invention, the following examples are included:

EXAMPLE 1

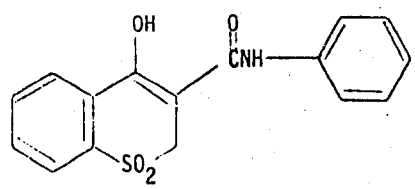

4-Hydroxy-2H-1-benzothiopyran-3-carboxanilide 1,1-Dioxide.

A solution of 7.8 g (0.04 mole) of thiochroman-4-one 1,1-dioxide in 100 ml. of tetrahydrofuran was added over a period of 30 minutes to a slurry of 0.088 mole of sodium hydride (3.7 g. of a 57% mineral oil dispersion) in 50 ml. of tetrahydrofuran at room temperature. The mixture was treated with 10 g. of phenylisocyanate and stirred at room temperature for one hour. The excess sodium hydride was destroyed by cautious addition of methanol, the mixture was poured into ice water, and extracted with ether. The aqueous layer was acidified and extracted with dichloromethane. Evaporation of the solvent gave a residue which was slurried with hot methanol. The resulting insoluble solid was collected and recrystallized from ethyl acetate to give 3 g. of product, mp. 205°–208° dec.

Anal. Calcd for $C_{16}H_{13}NO_4S$: C, 60.94; H, 4.16; N, 4.44; S, 10.17.

Found: C, 61.13; H, 4.18; N, 4.70; S, 9.87.

EXAMPLE 2

4-Hydroxy-2H-1-benzothiopyran-3-carboxanilide 1,1-Dioxides by Aminolysis of a β-Ketoester General Procedure A mixture of 9.4 g. (0.04 mole) of methyl 4-hydroxy-2H-1-benzothiopyran-3-carboxylate 1,1-dioxide, 0.06 mole of an appropriately substituted aromatic amine, and 250 ml. of xylene was refluxed for 16 hr. in a Soxhlet apparatus, the thimble of which contained 20 g. of Linde type 4A molecular sieve. The mixture was cooled to room temperature and the resulting crystalline precipitate was collected and purified as described for the individual examples.

EXAMPLE 3

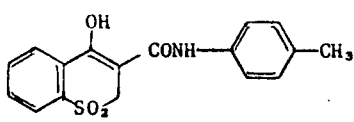

4-Hydroxy-2H-1-benzothiopyran-3-carboxy-p-toluidide 1,1-Dioxide

The use of 6.4 g. of p-toluidide gave 9.4 g. of crude product, mp. 233-236° dec. Recrystallization from 300 ml. of glacial acetic acid gave 8.6 g. of material, mp. 235°-237° dec.

Anal. Calcd for $C_{17}H_{15}NO_4S$: C, 61.99; H, 4.59; N, 4.25; S, 9.73.
Found: C, 62.09; H, 4.48; N, 4.52; S, 9.83.

EXAMPLE 4

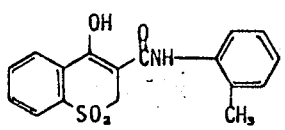

4-Hydroxy-2H-1-benzothiopyran-3-carboxy-o-toluidide 1,1-Dioxide

When 6.4 g. of o-toluidine was employed in the general procedure, the crude product did not separate from the reaction mixture on cooling. Therefore, it was extracted with 1N sodium hydroxide, the alkaline solution was washed well with ether and carefully neutralized with dilute hydrochloric acid. The resulting gummy precipitate was extracted with dichloromethane, the solvent was removed, and the residue was recrystallized from methanol to give 11.5 g. of product, mp. 149°-153°. Another recrystallization gave 7.5 g. of material, mp. 152°-153°.

Anal. Calcd for $C_{17}H_{15}NO_4S$: C, 61.99; H, 4.59; N, 4.25; S, 9.73.
Found: C, 62.15; H, 4.63; N, 4.30; S, 9.96.

EXAMPLE 5

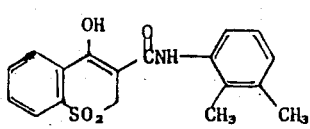

2′,3′-Dimethyl-4-hydroxy-2H-1-benzothiopyran-3-carboxanilide 1,1-Dioxide

The use of 7.3 g. of 2,3-dimethylaniline gave 13.0 g. of crude product, mp. 197°-207°. Recrystallization from acetic acid gave 10.7 g. of product, mp. 206°-209°.

Anal. Calcd for $C_{18}H_{17}NO_4S$: C, 62.96; H, 4.99; N, 4.08; S, 9.34.
Found: C, 62.83; H, 5.08; N, 3.97; S, 9.59.

EXAMPLE 6

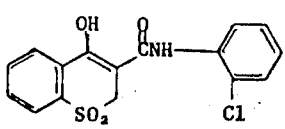

2′-Chloro-4-hydroxy-2H-1-benzothiopyran-3-carboxanilide 1,1-Dioxide

The use of 7.7 g. of o-chloroaniline gave 9.9 g. of crude product, mp. 149°-152°. Recrystallization, once from benzene and once from isopropyl alcohol, gave 5.6 g. of material, mp. 167°-169.5°.

Anal. Calcd for $C_{16}H_{12}ClNO_4S$: C, 54.94; H, 3.46; Cl, 9.17; N, 4.00; S, 10,14.
Found: C, 55.14; H, 3.63; Cl, 8.98; N, 4.04; S, 10.13.

EXAMPLE 7

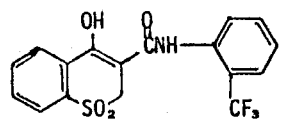

α,α,α-Trifluoro-4-hydroxy-2H-1-benzothiopyran-3-carboxy-o-toluidide 1,1-Dioxide

When 9.7 g. of o-trifluoromethylaniline was employed in the general procedure, the crude product did not separate from the reaction mixture on cooling. Therefore, it was extracted with 1N sodium hydroxide and the alkaline solution was carefully neutralized with dilute hydrochloric acid. The resulting precipitate was collected and recrystallized once from methanol and once from isopropyl alcohol to give 6.7 g. of product, mp. 174°-177°.

Anal. Calcd for $C_{17}H_{12}F_3NO_4S$: C, 53.26; H, 3.16; F, 14.87; N, 3.65; S, 8.36.
Found: C, 53.24; H, 3.10; F, 14.84; N, 3.62; S, 8.59.

EXAMPLE 8

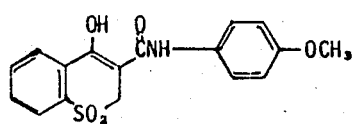

4-Hydroxy-2H-1-benzothiopyran-3-carboxy-p-anisidide 1,1-Dioxide

The use of 7.8 g. of p-anisidine gave 12.4 g. of crude product, mp. 227°-229° dec. Recrystallization from acetic acid (charcoaled) gave 10.7 g. of material, mp. 227°-230° dec.

Anal. Calcd for $C_{17}H_{15}NO_5S$: C, 59.12; H, 4.38; N, 4.06; S, 9.28.
Found: C, 59.06; H, 4.56; N, 3.91; S, 9.47.

EXAMPLE 9

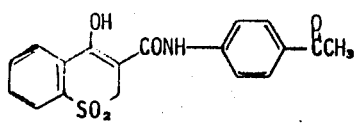

4′-Acetyl-4-hydroxy-2H-1-benzothiopyran-3-carboxanilide 1,1-Dioxide

The use of 8.5 g. of p-aminoacetophenone gave 13.1 g. of crude product, mp. 260°-263° dec. Recrystallization from 1,500 ml. of acetic acid gave 10.3 g. of material, mp. 260°–263° dec.

Anal. Calcd for $C_{18}H_{15}NO_5S$: C, 60.49; H, 4.23; N, 3.92; S, 8.97.

Found: C, 60.54; H, 4.08; N, 3.78; S, 9.12.

EXAMPLE 10

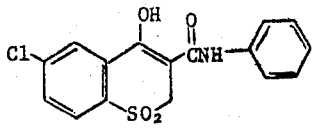

6-Chloro-4-hydroxy-2H-1-benzothiopyran-3-carboxanilide 1,1-Dioxide

A mixture of 11.5 g (0.04 mol) of methyl 6-chloro-4-hydroxy-2H-1-benzothiopyran-3-carboxylate 1,1-dioxide, 5.6 g (0.06 mol) of aniline, and 250 ml of xylene was refluxed for 4.5 hr in a Soxhlet apparatus, the thimble of which contained 20 g of Linde type 4A molecular sieve. The reaction mixture was cooled to room temperature and the resulting crystalline precipitate was collected and recrystallized from acetic acid to give 9.8 g of product; mp 235°–238°dec.

Anal. Calcd for $C_{16}H_{12}ClNO_4S$: C, 54.94; H, 3.46; Cl, 10.13; N, 4.00; S, 9.17.

Found: C, 54.87; H, 3.55; Cl, 10.42; N, 3.76; S, 9.16.

EXAMPLE 11

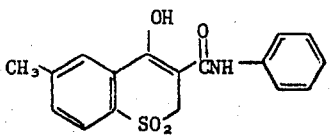

4-Hydroxy-6-methyl-2H-1-benzothiopyran-3-carboxanilide 1,1-Dioxide

The same procedure was employed, using 10.7 g (0.04 mol) of methyl 4-hydroxy-6-methyl-2H-1-benzothiopyran-3-carboxylate and a reaction time of 16 hr. The precipitate which separated from the reaction mixture was collected and recrystallized from acetic acid to give 11.0 g of product; mp 239°–241°dec.

Anal. Calcd for $C_{17}H_{15}NO_4S$: C, 61.99; H, 4.59; N, 4.25; S, 9.73.

Found: C, 61.85; H, 4.66; N, 4.24; S, 9.73.

We claim:
1. A compound of the formula:

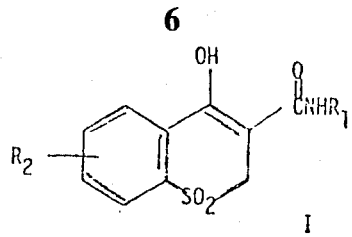

wherein $R_1$ is aryl, or aryl substituted by alkyl, aryl, aralkyl, alkoxy, halogen, cyano, nitro or trifluoromethyl; $R_2$ is alkyl, aryl, aralkyl, alkoxy, halogen, cyano, nitro, or trifluoromethyl in which "aryl" is of six to 10 carbon atoms, "alkyl" is of one to six carbon atoms and "alkoxy" is of one to six carbon atoms, or its pharmaceutically acceptable base salts.

2. A compound according to claim 1 which is 4-hydroxy-2H-1-benzothiopyran-3-carboxanilide 1,1-dioxide or its pharmaceutically acceptable base salts.

3. A compound according to claim 1 which is 4-hydroxy-2H-1-benzothiopyran-3-carboxy-p-toluidide 1,1-dioxide or its pharmaceutically acceptable base salts.

4. A compound according to claim 1 which is 4-hydroxy-2H-1-benzothiopyran-3-carboxy-o-toluidide 1,1-dioxide or its pharmaceutically acceptable base salts.

5. A compound according to claim 1 which is 2',3'-dimethyl-4-hydroxy-2H-1-benzothiopyran-3-carboxanilide 1,1-dioxide or its pharmaceutically acceptable base salts.

6. A compound according to claim 1 which is 2'-chloro-4-hydroxy-2H-1-benzothiopyran-3-carboxanilide 1,1-dioxide or its pharmaceutically acceptable base salts.

7. A compound according to claim 1 which is $\alpha,\alpha,\alpha$-trifluoro-4-hydroxy-2H-1-benzothiopyran-3-carboxy-o-toluidide 1,1-dioxide or its pharmaceutically acceptable base salts.

8. A compound according to claim 1 which is 4-hydroxy-2H-1-benzothiopyran-3-carboxy-p-anisidide 1,1-dioxide or its pharmaceutically acceptable base salts.

9. A compound according to claim 1 which is 4'-acetyl-4-hydroxy-2H-1-benzothiopyran-3-carboxanilide 1,1-dioxide or its pharmaceutically acceptable base salts.

10. A compound according to claim 1 which is 6-chloro-4-hydroxy-2H-1-benzothiopyran-3-carboxanilide 1,1-dioxide or its pharmaceutically acceptable base salts.

11. A compound according to claim 1 which is 4-hydroxy-6-methyl-2H-1-benzothiopyran-3-carboxanilide 1,1-dioxide or its pharmaceutically acceptable base salts.

* * * * *